United States Patent

Herzberg et al.

[11] Patent Number: 5,745,678
[45] Date of Patent: Apr. 28, 1998

[54] METHOD AND SYSTEM FOR THE SECURED DISTRIBUTION OF MULTIMEDIA TITLES

[75] Inventors: Amir Herzberg; Hugo Mario Krawczyk, both of Bronx, N.Y.; Shay Kutten, Rockaway, N.J.; An Van Le, Sunnyvale, Calif.; Stephen Michael Matyas, Poughkeepsie; Marcel Mordechay Yung, New York, both of N.Y.

[73] Assignee: International Business Machines Corporation, Armonk, N.Y.

[21] Appl. No.: 914,911

[22] Filed: Aug. 18, 1997

Related U.S. Application Data

[63] Continuation of Ser. No. 354,700, Dec. 13, 1994, abandoned.

[51] Int. Cl.[6] .................................................. H04L 9/00
[52] U.S. Cl. .................................................. 395/186; 380/4
[58] Field of Search .................................. 395/186, 187.01, 395/188.01; 380/3, 4, 9, 23, 25

[56] References Cited

U.S. PATENT DOCUMENTS

| | | | |
|---|---|---|---|
| 4,295,039 | 10/1981 | Stuckert | 235/380 |
| 4,309,569 | 1/1982 | Merkle | 340/825.34 |
| 4,658,093 | 4/1987 | Hellman | 380/25 |
| 4,789,863 | 12/1988 | Bush | 340/825.34 |
| 4,908,861 | 3/1990 | Brachtl et al. | 340/825.35 |
| 5,065,429 | 11/1991 | Lang | 380/25 |
| 5,191,613 | 3/1993 | Graziano et al. | 380/25 |
| 5,224,166 | 6/1993 | Hartman, Jr. | 380/50 |
| 5,231,666 | 7/1993 | Matyas | 380/25 |
| 5,241,671 | 8/1993 | Reed et al. | 707/104 |
| 5,247,575 | 9/1993 | Sprague et al. | 379/55.1 |
| 5,276,738 | 1/1994 | Hirsh | 380/46 |
| 5,319,705 | 6/1994 | Halter | 380/4 |
| 5,343,527 | 8/1994 | Moore | 380/4 |
| 5,379,343 | 1/1995 | Grube et al. | 380/4 |
| 5,421,006 | 5/1995 | Jablon et al. | 380/4 |
| 5,432,939 | 7/1995 | Blackledge | 395/700 |
| 5,450,489 | 9/1995 | Ostrover | 380/3 |
| 5,485,577 | 1/1996 | Eyer | 395/188.01 |
| 5,530,751 | 6/1996 | Morris | 380/4 |
| 5,535,188 | 7/1996 | Dang | 369/84 |
| 5,553,139 | 9/1996 | Ross | 380/4 |
| 5,553,143 | 9/1996 | Ross | 380/25 |

FOREIGN PATENT DOCUMENTS 565 314 A3  10/1993  United Kingdom.
570 123 A1  11/1993  United Kingdom.

*Primary Examiner*—Albert Decady
*Attorney, Agent, or Firm*—Casimer K. Salys; Daniel E. Venglarik; Andrew J. Dillon

[57] ABSTRACT

A method and system for detecting authorized programs within a data processing system. The present invention creates a validation structure for validating a program. The validation structure is embedded in the program and in response to an initiation of the program, a determination is made as to whether the program is an authorized program. The determination is made using the validation structure.

38 Claims, 6 Drawing Sheets

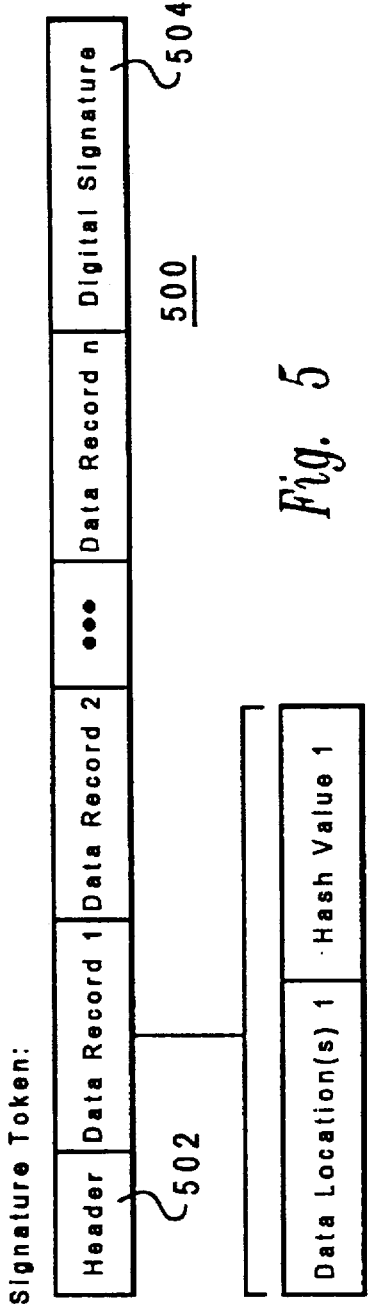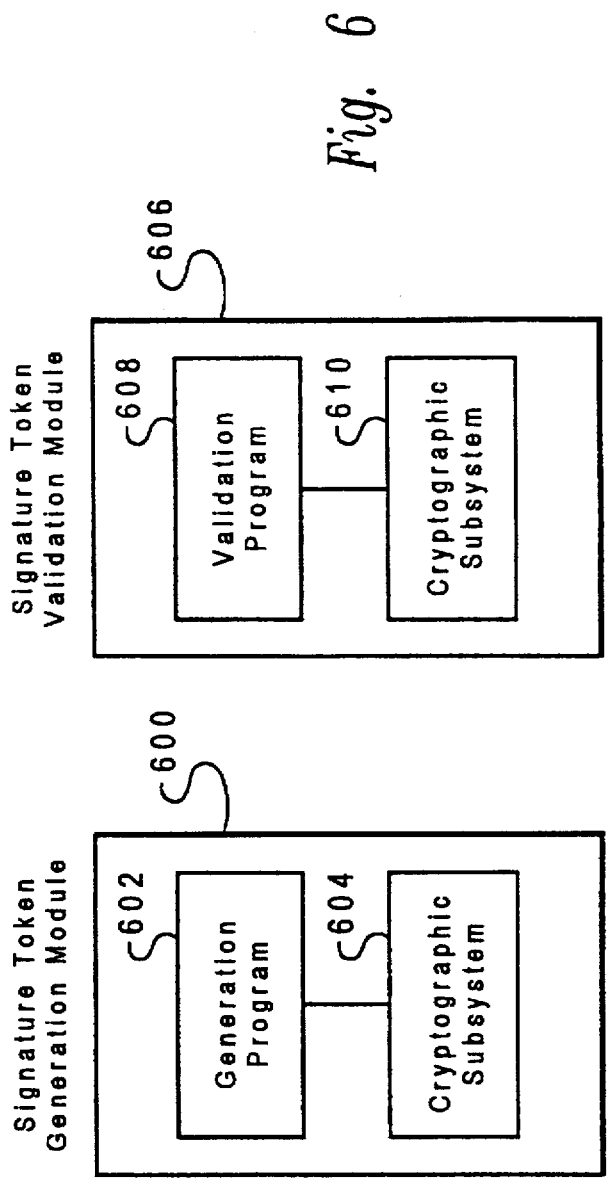

METHOD AND SYSTEM FOR THE SECURED DISTRIBUTION OF MULTIMEDIA TITLES

This is a continuation of application Ser. No. 08/354,700, filed Dec. 13, 1994, now abandoned.

BACKGROUND OF THE INVENTION

1. Technical Field

The present invention generally relates to an improved data processing system, and in particular to a method and system for distributing multimedia programs. Still more particularly, the present invention relates to a method and system for checking for authorized multimedia programs and detecting unauthorized multimedia programs in a data processing system.

2. Description of the Related Art

Multimedia data processing systems present information in data to a user utilizing sound, graphics, animation, and text. Programs presenting data and information to a user in this form are also called multimedia titles. Typically, a software company develops and markets a software system for the production and presentation of multimedia titles. Such a software system is used in composing multimedia scripts for multimedia titles. Typically, the software system includes a set of authoring tools for producing multimedia titles by developers and a Run Time Environment (RTE) for presenting the multimedia titles to end users. Typically, the RTE is designed to execute on various computing platforms, which makes the authoring tools for the software system desirable to developers. Typically, developers pay a royalty to the software company for using the authoring tools to develop multimedia titles to run on the RTE. But some unscrupulous developers may produce unauthorized titles and avoid royalty payments in producing multimedia titles for use on the RTE. Therefore, it would be advantageous to have a method and system to allow authorized titles to execute on a data processing system and to detect attempted execution of unauthorized titles.

SUMMARY OF THE INVENTION

It is one object of the present invention to provide an improved data processing system.

It is another object of the present invention to provide a method and system for distributing multimedia programs.

It is yet another object of the present invention to provide a method and system for checking for authorized multimedia programs and detecting unauthorized multimedia programs in a data processing system.

The present invention provides a method and system for detecting authorized multimedia programs within a data processing system. The present invention creates a validation structure for validating a multimedia program. The validation structure is embedded in the multimedia program and in response to an initiation of the multimedia program, a determination is made as to whether the multimedia program is an authorized multimedia program. The determination is made using the validation structure.

In creating the validation structure, sections of the program (hereinafter called data objects) are selected and a cryptographic hash value is created or calculated on each of the selected data objects. The cryptographic hash value and the location of the selected data object are stored as a data record within the validation structure. In addition, a signature is included or associated with the validation structure. The signature is calculated on the validation structure using a public key cryptographic algorithm in accordance with a preferred embodiment of the present invention.

Determining whether a multimedia program is an authorized multimedia program is accomplished by selecting a subset of the data objects within the multimedia program and validating the selected data objects using the validation structure stored in the multimedia program. This includes the steps of randomly selecting a portion of the data objects from among a defined set of data records listed in the validation structure, reading the selected data objects from the multimedia program using location information stored in the validation structure, and validating the selected data objects using validation information stored in the validation structure. For each selected data object, the location information stored in the validation structure is accessed and used to read the selected data object from the multimedia program. A cryptographic hash value is calculated on the selected data object and then compared for equality with a corresponding hash-value-of-reference stored in the validation structure. The hash values must be equal for the selected data objects to be valid. In addition, the validation structure is itself validated through the use of the signature previously calculated on the validation structure, using a public key cryptographic algorithm, and stored within the validation structure. If the signature, validation structure, and subset of selected data objects are valid, the multimedia program is considered to be an authorized multimedia program. An authorized multimedia program is allowed to execute normally, otherwise, execution of the multimedia program may be prohibited or limited execution of the multimedia program may be allowed in response to a determination that the multimedia program is not an authorized program.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram of a signature token generation module, depicted in accordance with a preferred embodiment of the present invention;

FIG. 6 is a block diagram of a signature token validation module depicted in accordance with a preferred embodiment of the present invention;

DETAILED DESCRIPTION OF PREFERRED EMBODIMENT

Figure 1:
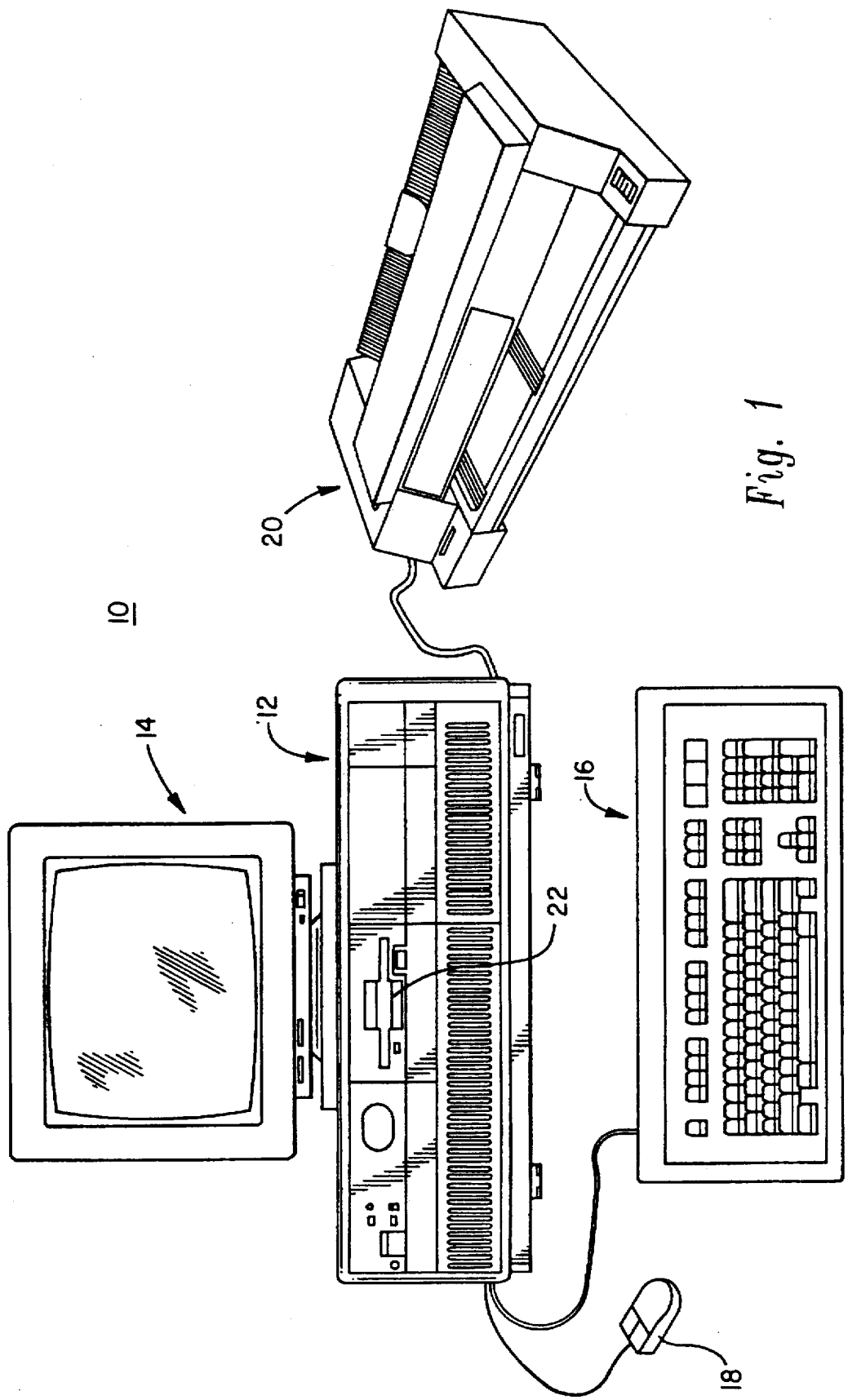
FIG. 1 depicts a data processing system in the form of a personal computer in which the present invention can be employed.

With reference now to the figures and in particular with reference to FIG. 1, a data processing system, personal computer system 10 is depicted, in which the present invention can be employed. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
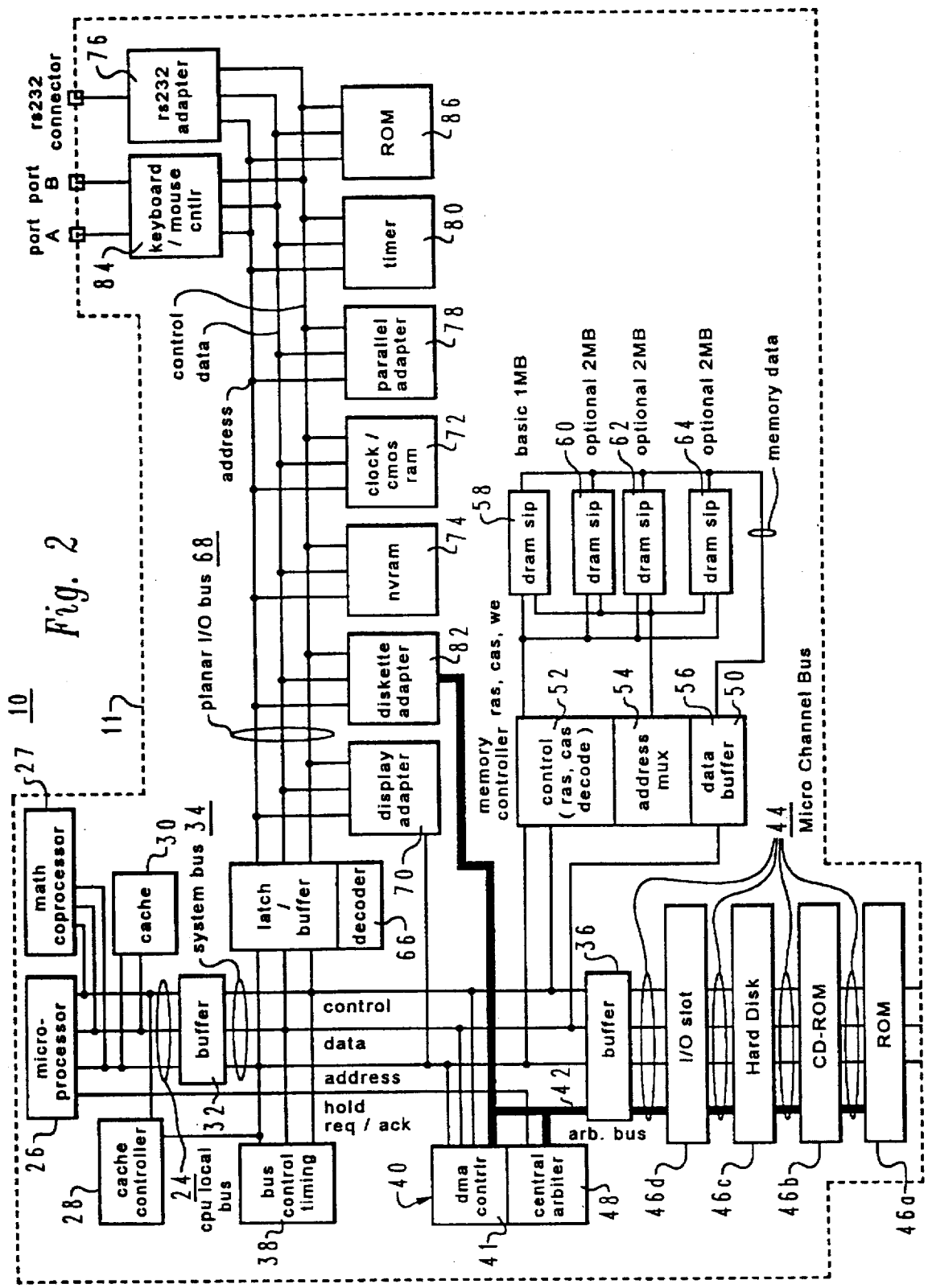
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46c has a hard disk drive connected to it; I/O slot 46b has a CD-ROM drive connected to it; and I/O slot 46a has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module in RAM 58, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14 depicted in FIG. 1), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Distribution of multimedia programs or titles (hereinafter called "multimedia titles") involves an application developer who produces multimedia titles using an authoring tool and a Run Time Environment (RTE) provided by a multimedia company and a user who purchases multimedia titles for execution on a computer or computer platform executing the RTE. In accordance with a preferred embodiment of the present invention, checking for authorized multimedia titles and detecting unauthorized multimedia titles involves a scheme of digital signatures using a public key algorithm. A "public key" is a key made available to anyone who wants to encrypt information. In public key cryptography, public key algorithms are used in which a public key is used for encryption and a private key is used for decryption. The basis for public key cryptography includes discrete logarithms, factoring, and the knapsack problem. Each authorized multimedia title includes an embedded digital signature token that can be verified by the RTE before the multimedia title is permitted to execute on the data processing system.

Two cryptographic subsystems are employed to facilitate the signature token generation and signature token verification processes in accordance with a preferred embodiment of the present invention. One cryptographic subsystem enables the generation of signature tokens that, when embedded in authorized multimedia titles, will permit these titles to be validated. Another cryptographic subsystem is employed to validate the signature tokens. In this manner authorized multimedia titles may be distinguished from unauthorized multimedia titles.

Figures 3, 4:
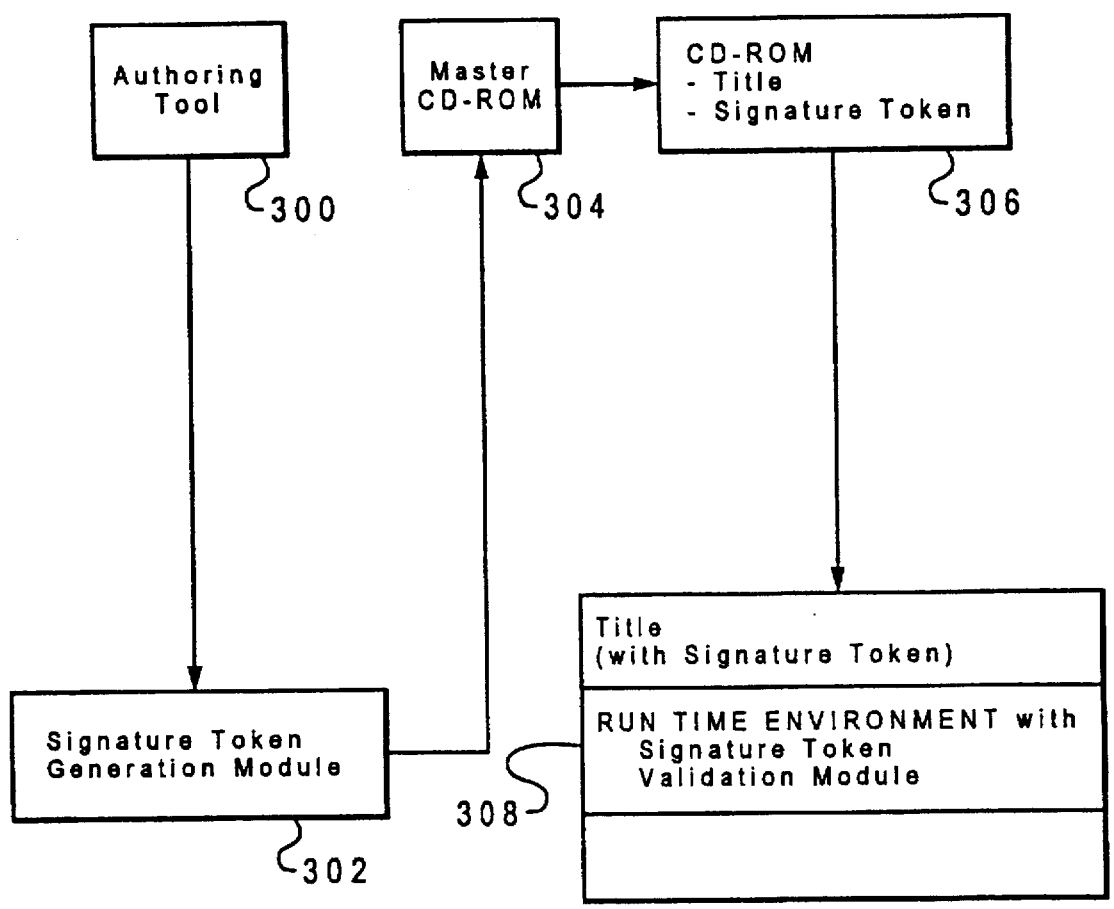
FIG. 3 is a block diagram of a creation and distribution process for multimedia titles on CD-ROM depicted in accordance with a preferred embodiment of the present invention.
FIG. 4 is a depiction of entries in a table of contents in accordance with a preferred embodiment of the present invention.

With reference to FIG. 3, a block diagram of a creation and distribution process for multimedia titles on CD-ROM is depicted in accordance with a preferred embodiment of the present invention. Those skilled in the art will recognize that the subject invention could be practiced in an implementation wherein multimedia titles are distributed on media other than a CD ROM medium. A multimedia title is developed by a developer using authoring tool 300. The multimedia title is then processed using signature token generation module 302. This module generates a signature token for the multimedia title. The signature token is embedded within the multimedia title. Thereafter, the multimedia title with the signature token embedded within it is sent back to the developer who creates a master CD-ROM 304. Alternatively, the signature token and multimedia title are sent back to the developer, whereupon the signature token is embedded into the multimedia title and a master CD-ROM 304 is created by the developer. From master CD-ROM 304, CD-ROM 306 is produced containing the multimedia title and the embedded signature token. CD-ROM 306 may be placed within data processing system 308, which includes the RTE with the signature token validation module in accordance with a preferred embodiment of the present invention. When the title is to be executed within data processing system 308, the RTE reads the signature token from the CD-ROM and validates the signature token and a selected portion of the data objects also read from the CD-ROM using the signature token validation module.

Typically, a multimedia title takes about one hour to play and contains about 650 megabytes of data. As a result, it is inefficient to validate a multimedia title by reading and checking each byte within the title. In accordance with a preferred embodiment of the present invention, the multimedia title is validated by checking a portion of the data contained therein.

Random sampling of data to validate multimedia titles is employed in accordance with a preferred embodiment of the present invention. If the data locations to be sampled were constant from one instance of validation to the next, then only a small portion of the multimedia title would be checked. In such a situation, forged titles could be more easily constructed. But by randomly selecting data locations for sampling, the possibility of forged multimedia titles is greatly reduced.

In addition, the presently claimed invention utilizes data context sampling. A significant improvement in the validation of multimedia titles may be achieved if the logical structure of the multimedia titles themselves is employed to identify key pieces of data to be validated. For example, a preferred checking strategy may be based on checking part or all of the data in the table of contents for each file in a multimedia title. A multimedia title consists of one or more files, each containing its own table of contents. In many cases the multimedia title contains only one such file. When a file is opened, the table of contents is the first item to be read.

With reference now to FIG. 4, a depiction of entries in a table of contents is illustrated in accordance with a preferred embodiment of the present invention. Table of contents 400 includes entries 402–408. Each entry includes an object identifier, a property identifier, a type, and a location (offset and length). As a result, a particular entry indicates that at a particular offset on the disk, for this many bytes, a property with this ID belonging to an object with this ID of this type is located. Because the table of contents references data on the basis of an Object ID and a Property ID, the referenced data object is said to be referenced by an object-property (OP) pair and the data object is referred to as OP data. Of course, other formats and specifications for the table of contents may be utilized in accordance with a preferred embodiment of the present invention. The table of contents, regardless of its format, structure, and sematics, may be employed to effectively validate a multimedia title in accordance with a preferred embodiment of the present invention. Typically in multimedia titles, the table of contents is an example of a relatively short and easily identifiable piece of information that has an intrinsic dependency with most of the other parts of the multimedia title. The table of contents could take the form of a symbol table, a linkage map, and so forth, but is rigidly specified and highly structured.

Furthermore, for multimedia titles, the first few displayed screens typically contain the name of the title and its version. As a result, protecting these screens is desirable. Therefore, a checking strategy may include checking the first few screens of data displayed to a user so that a forged title, whose name is for example "Demons for the Deep", would be forced to display the name of the title upon which it is piggy-backing, say "Desert Wargames".

The present invention provides a method and system for validating multimedia titles by validating part or all of the table of contents and the first few displayed screens containing the name of the title and its version for each multimedia file and validating a subset of the data objects in the multimedia title. These data objects are selected randomly in accordance with a preferred embodiment of the present invention. But those skilled in the art will recognize that the data objects could be selected using a preferred method which is non-random, without departing from the spirit of the present invention.

With reference to FIG. 5, a diagram of a signature token is depicted in accordance with a preferred embodiment of the present invention. Signature token 500 is constructed by a signature token generation module (not shown in FIG. 5). The signature token is constructed step-by-step by making repeated service requests to the signature token generation module. Once created, signature token 500 is embedded in the multimedia title upon which it was generated. This signature token is validated by a signature token validation module in the RTE. In validation, the signature token is validated step-by-step by making repeated service requests to the signature token validation module.

Signature token 500 includes a header 502 and data records 1 through n that correspond to data or data objects in the multimedia title that can be selected and validated. The data records 1 through n in the signature token are different from the data objects in the multimedia title, although there is a direct correspondence. In addition, signature token 500 includes digital signature 504, which is employed to validate the header and the series of data records 1 through n in the signature token. Each data record within signature token 500 includes location specific information, L, and a cryptographic hash value, H. Location specific information tells the signature token validation module the location or locations in the multimedia title of the data to be validated. The hash value is calculated on the specific multimedia data referenced by L. In accordance with a preferred embodiment of the present invention, the cryptographic hash value is calculated using a one-way function. A one-way function is one where it is computationally infeasible to find two different inputs X and Y, such that the cryptographic hash of X is equal to the cryptographic hash of Y. The term "computationally infeasible" is one used in prior art to describe a mathematical procedure that cannot be performed in the practical sense because of the very large number of computational steps required. However, the term is not precise in that there is no prescribed number of computations above which a computation is said to be computationally infeasible and below which the computation is said to be computationally feasible. In general, a mathematical procedure is said to be computationally infeasible if the cost or time to perform the necessary computations is beyond reasonable human means, e.g., if all the computers in the world linked together couldn't solve the problem in a billion billion billion years.

Location specific information may be a combination of location specific information stored in signature token 500 and location specific information derived algorithmically. The table of contents in a multimedia title is one example of location specific information that can be omitted from signature token 500. In other words, signature token 500 does not need to store an address or location of the table of contents because a simple procedure exists for always finding the table of contents given a standard starting point.

A portion of the data records 1 through n in signature token 500 will reference data in one or more data objects in the multimedia title. The signature token generation module employs a process to select a subset of different data objects (referenced by the object-property pairs in the table of contents) from a multimedia title to be validated. This process will be described in more detail below. It is desirable to have an element of randomness in this process although strictly speaking random in this process is not required. Once the subset of data objects in the multimedia title have been identified, a subportion of the data in each data object is selected and the locations of these subportions of data (denoted L1, L2, . . . , Ln) are used by the signature token generation module to read the data associated with each subportion. The signature token generation module then issues a service request to the cryptographic subsystem to generate a cryptographic hash value Hi on each subportion of data referenced by location information Li. The cryptographic hash value, Hi, is then stored in data record i together with the location information, Li. After the header and data records 1 through n have been created the signature token generation module issues a service request to the cryptographic subsystem to calculate a cryptographic hash value on the signature token, except for the digital signature. The signature token generation module then issues a service request to the cryptographic subsystem to calculate a digital signature on the signature token, using the cryptographic hash value calculated on the signature token and the private key of the multimedia company. The digital signature is then stored in the signature token.

The signature token validation module will randomly select and validate a subset of the data records in the signature token thus introducing an element of randomness into the validation process in accordance with a preferred embodiment of the present invention. Once the subset of data records has been randomly selected, the signature token validation module will process each data record on a record-by-record basis. The location specific information, L, in the data record is used to read the referenced data from the CD-ROM. A service request is then issued to the cryptographic subsystem to generate a cryptographic hash value, H, on the referenced data. This calculated cryptographic hash value is then compared for equality with the reference cryptographic hash value, H, stored in the data record. If the cryptographic hash values are equal, the process then continues. Otherwise, processing may be halted with an indication that validation has failed. After each data record is processed, the signature token validation module issues a service request to the cryptographic system to cryptographically hash the signature token (except for the digital signature) that it previously read from the multimedia title. Then a service request is issued to the cryptographic subsystem to validate the digital signature. In accordance with a preferred embodiment of the present invention, the digital signature is encrypted with the public key of the multimedia company, stored in the signature token validation module. The encrypted value of the digital signature contains a hash-value-of-reference previously calculated on the valid signature token. The calculated hash value is then compared for equality with the so-obtained hash-value-of-reference. If the hash values are equal, then the signature token and digital signature are valid. Otherwise, the signature token and digital signature are not valid. Those skilled in the art will recognize that the subject invention can be practiced using any digital signature method without departing from the spirit of the invention.

The digital signature also can be calculated on a cryptographic hash value representing the root of a tree of cryptographic hash values, e.g., a binary tree of cryptographic hash values as described in U.S. Pat. No. 4,309,569, "Method of Providing Digital Signatures". By storing n−1 additional intermediate cryptographic hash values in the signature token, m of the possible n data objects in the signature token can be validated using m*log2n hashing operations instead of n hashing operations, which for small n may be more advantageous. A method of calculating the tree of cryptographic hash values is described in U.S. Pat. No. 4,309,569 and in U.S. Pat. No. 5,231,666, "Cryptographic Method For Updating Financial Records".

With reference now to FIG. 6, a block diagram of a signature token generation module and a signature token validation module is depicted in accordance with a preferred embodiment of the present invention. Signature token generation module 600 includes generation module 602 and cryptographic subsystem 604. Signature validation module 606 includes a validation program 608 and a cryptographic subsystem 610. Generation program 602 in signature token generation module 600 selects data (including data in randomly selected data objects) in the multimedia title to be validated. Generation program 602 reads data from the multimedia title and processes the data by issuing repeated service requests to cryptographic subsystem 604. These repeated service requests to process data are used to build a signature token. Similarly, validation program 608 in signature token validation module 606 randomly selects (for subsequent processing and validation) a subset of the data records in the signature token generated by signature token generation module 600. This data is read from the CDROM and is processed by issuing repeated service requests to cryptographic subsystem 610 to validate the signature token.

Cryptographic subsystem 604 provides the following cryptographic services to generation program 602: (1) initialize random number generator, (2) generate random number, (3) generate hash value, (4) generate digital signature, and (5) verify digital signature. A verify digital signature function is provided so that once a signature token is generated, generation program 602 can validate the signature token to insure that the signature token can be correctly processed by cryptographic subsystem 610 and signature token module 606. Such a verification function provides a high integrity process in creating multimedia titles with embedded signature tokens. Cryptographic subsystem 610 in signature token validation module 606 supports validation program 608 by providing the following services: (1) initialize random number generator, (2) generate random number, (3) generate hash value, and (4) verify digital signature. The random number generation is employed to randomly select data records in the signature token to be validated. Algorithms and procedures for generating random numbers, generating hash values, and for generating and verifying digital signatures are well know within the prior art.

The random number generator function can be implemented using the pseudo random integer generator supplied in Appendix C of American Standard Institute (ANSI) Standard X9.17, "Financial Institution Key Management (Wholesale)" as specified in Appendix 3 of Federal Information Processing Standard (FIPS) 186.

The initialize random number generator function is a function that causes a secret seed value to be generated within the random number generator or alternatively to be provided as an input to the random number generator. A simple method for initializing the random number generator is to employ a free-wheeling counter in combination with a series of requests to a human who interacts with the initialize random number generator function via a workstation keyboard and display. The user is repeatedly prompted to enter a character at the keyboard. Each time the random number generator function gets control, it reads the free-wheeling counter and this value is combined with a value stored in an accumulator. The final accumulator value is taken as the secret seed value. Because of small differences in human response time, the value of the free-wheeling counter is unpredictable, and therefore the resulting seed value will be random.

The generate hash function can be implemented using one of several algorithms, including the MDC-2 or MDC-4 algorithms described in U.S. Pat. No. 4,908,861 entitled "Data Authentication Using Modification Detection Codes Based on a Public One Way Encryption Function" or using the hashing algorithm in FIPS 180, "Secure Hash Standard."

The generate digital signature and verify digital signature functions can be implemented with the RSA public key algorithm using ISO Standard 9796 "Digital Signature Scheme Giving Message Recovery" or by using signature generation and signature verification algorithms in FIPS 186, "Digital Signature Standard."

Although the depicted embodiment employs a public key algorithm, which is an asymmetric algorithm, the digital signature can be based on a symmetric algorithm such as the Data Encryption Standard (DES).

Figure 7:
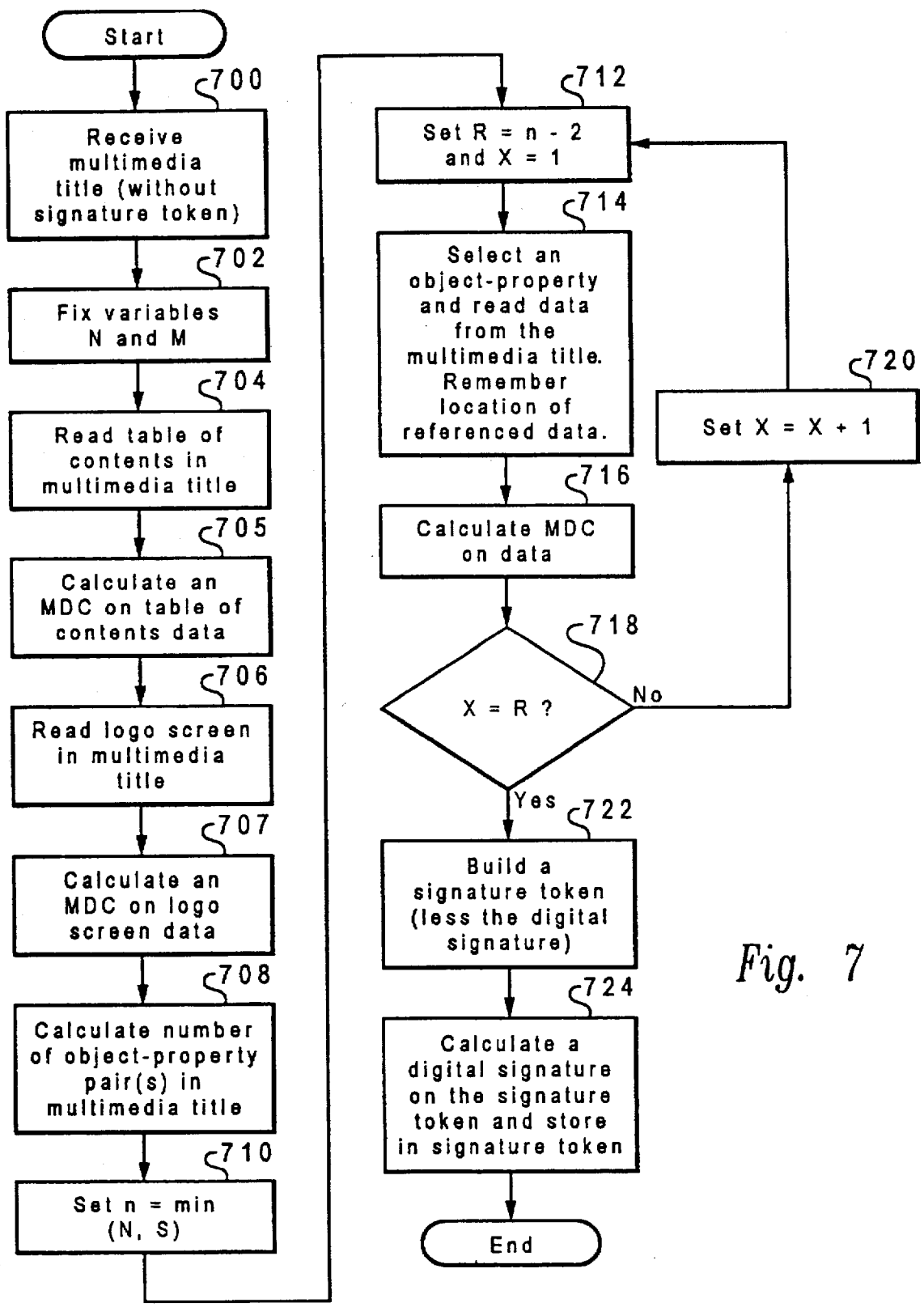
FIG. 7 is a flowchart of a process for generating signature tokens in a signature token generation module depicted in accordance with a preferred embodiment of the present invention.

With reference now to FIG. 7, a flowchart of a process for generating signature tokens in a signature token generation module is depicted in accordance with a preferred embodiment of the present invention. The process begins by receiving a multimedia title with the signature token (step 700). Thereafter, the process fixes variables N and M such that N is the maximum number of data records to be created for the signature token that is to be produced, and M is the maximum record data length in bytes of each selected data object (step 702). For example, N=1,000 and M=1,000 are possible values for N and M. The process then locates and reads the table of contents or equivalent information contained in the multimedia title (step 704). This information is called "D1". In accordance with a preferred embodiment of the present invention, a 128 bit MDC, designated MDC 1, is calculated on the data D1 (step 705). Using the table of contents as necessary, the first logo screen is located and read from the multimedia title (step 706). The logo screen contains the name of the multimedia title and is designated "D2". A 128 bit MDC, designated MDC 2, is calculated on the data D2 (step 707).

Using the table of contents, the process then determines the number of multimedia object-property pairs, S, contained in the multimedia title (step 708). An object-property is data pointed to by the object-property entry in a table of contents. S is calculated as S=S<1>+S<2>+ . . . +S<T>, where S<i> denotes the number of properties associated with multimedia object "i", and "T" denotes the number of multimedia objects within the multimedia title. The process then sets n=min (N,S), the minimum of N and S (step 710).

Typically, S will be much larger than N so that N=n will generally hold true. The process then sets R=n−2 and X=1 (step 712). Thereafter, an object-property pair is randomly selected from the multimedia title; the data corresponding to each object-property pair is located and read, and the locations(s) of the data are saved (step 714). "D3" denotes the information corresponding to the object-property pair (or the first n bytes of information) in the randomly selected object-property, which ever is less. L3 denotes the information in the table of contents employed to locate and read the data corresponding to the randomly selected object-property pair. In effect, the process selects one of the S object-property pairs (excluding the table of contents and the logo screen) and then at the next iteration randomly selects one of the S−1 remaining different object-property pairs with the previously selected object-property pair being excluded and so on and so forth.

The process then calculates the MDC on the data or data object referenced by the selected object-property pair (step 716). In accordance with a preferred embodiment of the present invention, a 128 bit MDC is calculated on the data associated with the object-property pair using the method described in U.S. Pat. No. 4,908,861 entitled "Data of Authentication Using Modification Detection Codes Based on a Public One Way Encryption Function". The MDC values calculated on values D3 through Dn are denoted MDC 3 through MDCn, respectively, as the process loops through (steps 714 and 716). The process determines whether X=R (step 718). If X is not equal to R, the process sets X=X+1 (step 720) and returns to step 714. This continues until R=n−2 different object property pairs have been processed.

When X=R, the process then proceeds to build a signature token, such as signature token 500 depicted in FIG. 5, consisting of a header, n data records, and a digital signature (step 722). The token type (e.g., "multimedia signature token") and n (number of data records) is stored within the header. In the first data record, the data location and the hash value are set to the constant value "table of contents" and the calculated value of MDC 1, respectively. The term "table of contents" is stored in the data location sub-field in lieu of location information because the signature token validation module always knows the location of the table of contents in accordance with a preferred embodiment of the present invention. In the second data record in the signature token, the data location and hash value are set to the constant value "logo screen" and the calculated value of MDC2, respectively. The term "logo screen" is stored in the data location sub-field in lieu of location information because the signature token validation module is able to calculate the location of the logo screen from the information found in the table of contents in accordance with a preferred embodiment of the present invention. The data locations and hash values in data records 3, 4, . . . , n are set to (L3, MDC3), (L4, MDC4), . . . , (Ln, MDCn), respectively. Note also that the hash values H1 through Hn in data records 1 through n of the signature token are equal to the MDC values: MDC1 through MDCn, respectively.

Furthermore, the signature token also includes space for a digital signature in accordance with a preferred embodiment of the present invention. An RSA digital signature based on ISO Standard 9796 might typically require from 512 to 2048 bits of storage space. A DSS digital signature based on FIPS 186 requires 320 bits of storage space. At step 722, the digital signature portion of the signature token is presently uninitialized. Thereafter, the process calculates a digital signature for the signature token with the multimedia company's private key (step 724). More specifically, a 128 bit MDC is calculated on the portion of the signature token consisting of the header and the n data records. This calculation may be performed using the process described in U.S. Pat. No. 4,908,861 entitled "Data Authentication Using Modification Detection Codes Based on a Public One Way Encryption Function".

Thereafter, a digital signature is calculated on the MDC value using the private key of the multimedia company in accordance with a preferred embodiment of the present invention. The digital signature could be calculated with an RSA private key in accordance with ISO standard 9796 or with a DSA private key in accordance with FIPS 186. Those skilled in the art will recognize that private keys of different lengths can be employed to calculate the digital signature, and that digital signatures of different lengths can be stored in the signature token in accordance with a preferred embodiment of the present invention. Thereafter, the digital signature is stored in the signature token and the process terminates.

Figure 8:
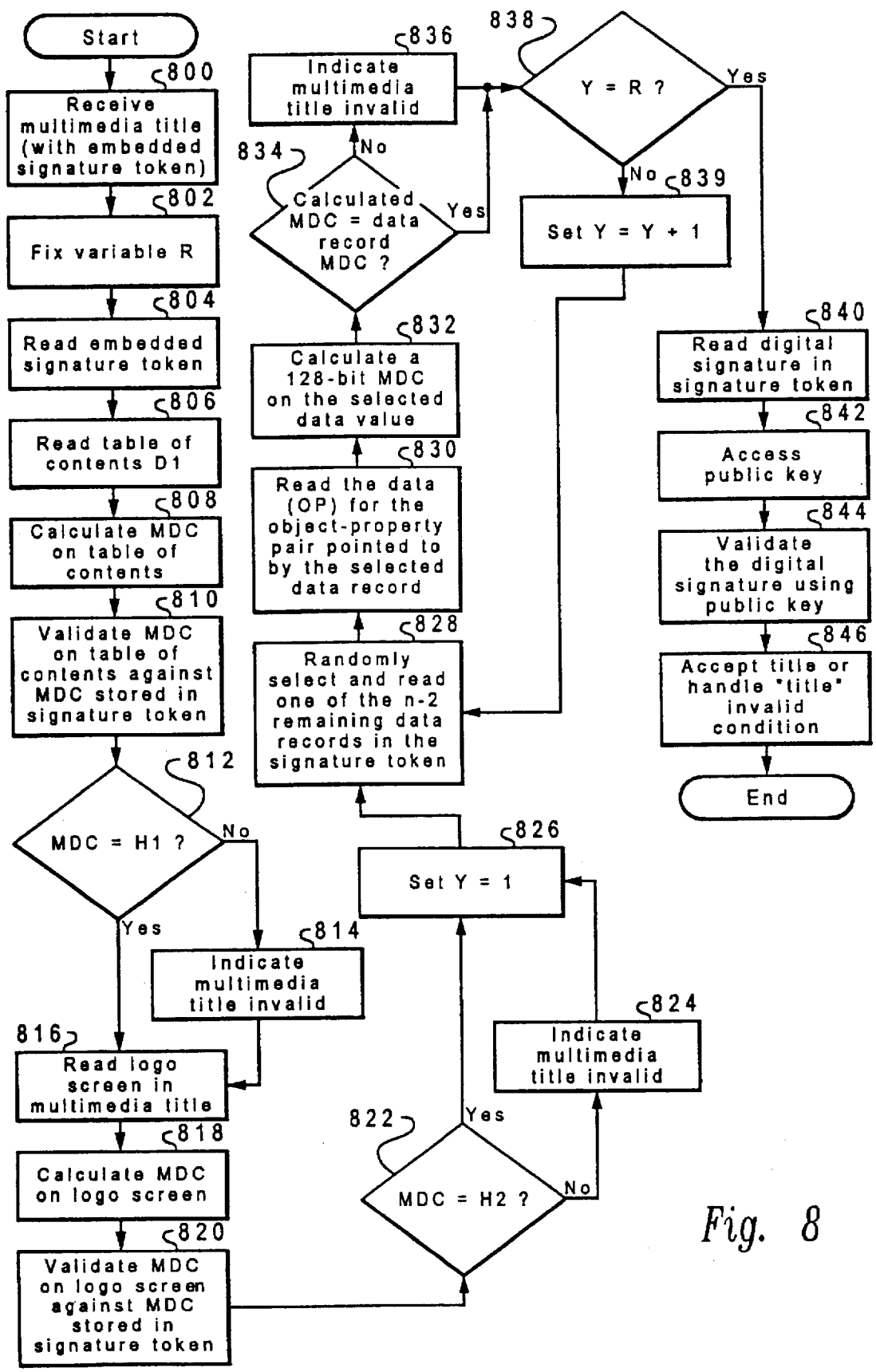
FIG. 8 is a flowchart of a process for validating multimedia titles in a validation program depicted in accordance with a preferred embodiment of the present invention.

With reference now to FIG. 8, a flowchart of a process for validating multimedia titles in a validation program is depicted in accordance with a preferred embodiment of the present invention. This process is employed within the signature token validation module 606 of FIG. 6. The process begins by receiving a multimedia title with the embedded signature token (step 800). The process then fixes variable R, where R in this flowchart is the number of data records to be randomly authenticated (step 802). For example, R may be any value, such as 3, 4, 5, etc., but will generally be a small value in order to minimize the required processing time. Thereafter, the process reads the embedded signature token (step 804). In accordance with a preferred embodiment of the present invention, the table of contents may be used to locate and read the embedded signature token.

The process then locates and reads the table of contents or equivalent information contained in the multimedia title (step 806). This information is called "D1". The process then calculates a 128 bit MDC on the table of contents, D1 (step 808). This calculation may be performed in various ways. For example, the process described in U.S. Pat. No. 4,908,861, entitled "Data Authentication Using Modification Detection Codes Based on a Public One Way Encryption Function" may be used. The process then validates the MDC calculated on the table of contents against the MDC-of-reference stored in the signature token (step 810). The 128 bit MDC calculated in step 808 is compared with H1 in the first data record in the signature token. The process then determines whether the two values are equal (step 812). If MDC is not equal to H1, the process then indicates that the title is invalid (step 814). In accordance with a preferred embodiment of the present invention, an invalid multimedia title so-detected by the signature token validation module causes an indicator or indication to be set, but does not halt processing. However, the present invention could be practiced using an implementation wherein the processing is halted as soon as an invalid condition is detected, which would not depart from the spirit of the present invention.

If, however, MDC is equal to H1, the process then locates and reads the first logo screen that is displayed to a user in the multimedia title (step 816). The table of contents may be used to locate and read this logo screen. The logo screen contains the name of the multimedia title, and this information is called "D2". Next, an MDC is calculated on the data comprising the logo screen (step 818). A 128 bit MDC is calculated in accordance with a preferred embodiment of the present invention. The process then validates the MDC calculated on the logo screen against the MDC stored in the signature token (step 820). The 128 bit MDC calculated in step 818 is compared with H2 in the second data record in the signature token. The process then determines whether the two values are equal (step 822). If MDC is not equal to H2, the process then indicates that the title is invalid (step 824). The process then sets Y=1 (step 826).

The process also sets Y=1 if MDC is equal H2 (step 826). The process then randomly selects and reads one of the n−2 remaining data records in the signature token (step 828). The data records are selected from data record 3 through data record n, inclusively. Each data record is associated with and refers to all or a portion of the data for a single object-property pair in the multimedia title. The process then reads the data OP1 associated with the object-property pair pointed to by the selected data record (step 830). The data location information in the data record is used to locate and read the data OP1 associated with the referenced object-property pair in the multimedia title.

Next, the process calculates a 128 bit MDC on the selected data OP1 (step 832). The process then validates the MDC calculated on the data OP1 against the corresponding MDC, or hash value H, stored in the data record read from the signature token (step 834). In step 834 the 128 bit MDC calculated in step 832 is compared with the corresponding MDC, or hash value H, recovered from the data record. If the calculated MDC and stored MDC are equal, control is passed to step 838. If the MDC values are not equal, the process indicates that the title is invalid (step 836) and control is passed to (step 838). The process determines whether Y=R (step 838). If Y is not equal to R, the process sets Y=Y+1 (step 839) and returns to step 828. This continues until R data records have been randomly selected from among data records 3 through n in the signature token, and processed. When Y=R, the process then proceeds to validate the digital signature and signature token. Next, the process reads the digital signature in the signature token (step 840).

Thereafter, the process accesses the multimedia company's public key, which is stored as a fixed constant in the signature token validation module (step 842). The process then validates the signature using the public key (step 844). A 128 bit MDC is calculated on the portion of the signature token consisting of the header and the n data records. When an RSA digital signature is employed, the original 128 bit hash value H is recovered from the RSA digital signature using the process described in ISO standard 9796 utilizing the RSA public key. Thereafter, the 128 bit MDC calculated on the signature token including the header and the n data records are compared with the 128 bit hash value H. If these MDCs are equal, then the multimedia title is accepted as valid. Otherwise, the process indicates that the title is invalid. When a digital signature based on FIPS 186 is employed, the signature is validated by following the steps outlined in FIPS 186, which are different from those used to validate an RSA digital signature.

The process then accepts the title or handles the title invalid condition (step 846). If the title is indicated as being invalid, several actions may be taken in accordance with a preferred embodiment of the present invention. For example, the multimedia title may be rejected, the multimedia title may be accepted, but the user is given a warning screen; the multimedia may be accepted, but the user may be required to start over. Of course, the signature may be validated before the table of contents, logo screen, and randomly selected data records are checked in accordance with a preferred embodiment of the present invention. Depending on the implementation other logical structures other than the table of contents or logo screen may or may not be checked.

The processes depicted in FIGS. 3–8 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for detecting unauthorized programs within the data processing system, the method comprising:

creating a validation structure for validating a program including program data, wherein the structure includes data derived from data selected from a portion of the program data other than a lead-in section of the program data, which is used to determine whether the program is an unauthorized program;

imbedding the validation structure in the program; and responsive to an initiation of the program, determining whether the program is an authorized program using the validation structure.

2. The method of claim 1, further comprising preventing execution of the program in response to a determination that the program is unauthorized.

3. The method of claim 1, further comprising permitting limited execution of the program in response to a determination that the program is unauthorized.

4. The method of claim 1, where in the determining step comprises randomly selecting portions of the validation structure; and determining whether the program is an unauthorized program using the randomly selected portions of the validation structure.

5. The method of claim 1, wherein the creating step comprises randomly selecting data from within the program.

6. The method of claim 5, wherein the creating step comprises:

randomly selecting a plurality of sections from within the program;

creating a cryptographic hash value for each selected section from the plurality of randomly selected sections within the program; and storing the cryptographic hash value and a location value for each selected section as a data record within a validation structure, wherein the location is a location of the selected section within the program.

7. The method of claim 6, wherein the creating step further comprises:
creating a signature for the validation structure, wherein the signature is a cryptographic hash value calculated on the validation structure; and
associating the signature with the validation structure.

8. The method of claim 7, wherein the associating step comprises placing the signature within the validation structure.

9. The method of claim 1, wherein the determining step comprises:
randomly selecting a number of data records from within the validation structure;
for each randomly data selected record, creating a cryptographic hash value on the section in located indicated by the location value for the randomly selected data record; and
comparing the created cryptographic hash value with the hash value within the randomly selected data record.

10. The method of claim 9, wherein the determining step further comprises:
creating a cryptographic hash value for the validation structure; and
comparing the created cryptographic hash value with the signature.

11. A data processing system for detecting unauthorized programs within the data processing system, the data processing system comprising:
creation means for creating a validation structure for validating a program including program data, wherein the structure includes data derived from data selected from a portion of the program data other than a lead-in section of the program data, wherein the structure may be used to determine whether the program is an unauthorized program;
imbedding means for imbedding the validation structure in the program; and
determination means, responsive to an initiation of the program, for determining whether the program is an unauthorized program.

12. The data processing system of claim 11, further comprising means for preventing execution of the program in response to a determination that the program is unauthorized.

13. The data processing system of claim 11, further comprising means for permitting limited execution of the program in response to a determination that the program is unauthorized.

14. The data processing system of claim 11, wherein the determination means comprises
random selection means for randomly selecting portions of the validation structure; and
determination means for determining whether the program is an unauthorized program using the randomly selected portions of the validation structure.

15. The data processing system of claim 11, wherein the creation means comprises:
second random selection means for randomly selecting a plurality of sections from within the program;
second creation means for creating a cryptographic hash value for each selected section from the plurality of randomly selected sections within the program; and storage means for storing the cryptographic hash value and a location value for each selected section as a data record within a validation structure, wherein the location is a location of the selected section within the program.

16. The data processing system of claim 14, wherein the creation means further comprises:
third creation means for creating a signature for the validation structure, system is calculated on the cryptographic hash value; and
association means for associating the signature with the validation structure.

17. The data processing system of claim 16, wherein the association means comprises placement means for placing the signature within the validation structure.

18. The data processing system of claim 16, wherein the determination means comprises:
random selection means for randomly selecting a number of data records from within the validation structure;
creation means for creating a cryptographic hash value on the section in located indicated by the location value for the randomly selected data record for each randomly data selected record; and
comparison means for comparing the created cryptographic hash value with the hash value within the randomly selected data record.

19. The data processing system of claim 18, wherein the determination means further comprises:
creation means for creating a cryptographic hash value for the validation structure; and
validation means for the created cryptographic hash value with the signature.

20. A method in a data processing system for creating a validation structure for use in validating a program, the method comprising:
selecting a plurality of sections other than a lead-in section from within the program, each section within the plurality of sections containing program data;
creating a cryptographic hash value for each selected section from the program data within the plurality of selected sections within the program; and
storing the cryptographic hash value and a location for each selected section as a data record within a validation structure, wherein the location is a location of the selected section within the program.

21. The method of claim 20, wherein the selecting step comprises randomly selecting a plurality of sections from within the program.

22. The method of claim 20, wherein the creating step further comprises:
creating a signature for the validation structure, and
associating the signature with the validation structure.

23. The method of claim 22, wherein the associating step comprises placing the signature within the validation structure.

24. A data processing system for creating a validation structure for use in validating a program, the data processing system comprising:
random selection means for randomly selecting a plurality of sections other than a lead-in section from within the program, each selected section within the plurality of randomly selected sections containing program data;
creations means for creating a cryptographic hash value for program data within each selected section from within the plurality of randomly selected sections within the program; and storage means for storing the cryptographic hash value and a location value for each selected section as a data record within a validation structure, wherein the location is a location of the selected section within the program.

25. The data processing system of claim 24, wherein the creation means further comprises:

second creation means for creating a signature for the validation structure, and association means for associating the signature with the validation structure.

26. The data processing system of claim 25, wherein the association means comprises placement means for placing the signature within the validation structure.

27. A method in a data processing system for validating a program, wherein the program includes a validation structure having a plurality of data records, wherein each data record within the plurality of data records includes a cryptographic hash value for program data within a section other than a lead-in section of the program and a location value, wherein the location value indicates a location of the section, the method comprising:

randomly selecting a number of data records from within the validation structure;

creating a cryptographic hash value on program data within the section in the location indicated by the location value for the randomly selected data record for each randomly selected data record; and comparing the created cryptographic hash value with the hash value within the randomly selected data record.

28. The data processing system of claim 27, wherein the determination means further comprises:

creating a cryptographic hash value for the validation structure; and validating the created cryptographic hash value with the signature.

29. A data processing system for validating a program, wherein the program includes a validation structure having a plurality of data records, wherein each data record within the plurality of data records includes a cryptographic hash value for program data within a section other than a lead-in section of the program and a location value, wherein the location value indicates a location of the section, the data processing system comprising:

random selection means for randomly selecting a number of data records from within the validation structure;

creation means for creating a cryptographic hash value on program data within the section in the location indicated by the location value for the randomly selected data record for each randomly selected data record; and comparison means for comparing the created cryptographic hash value with the hash value within the randomly selected data record.

30. The data processing system of claim 29, wherein the determination means further comprises:

creation means for creating a cryptographic hash value for the validation structure; and signature validation means for validating the created cryptographic hash value with the signature.

31. A storage device readable by a data processing system and encoding data processing system executable instructions comprising:

selection means for selecting a plurality of sections other than a lead-in section from within a program containing program data;

creation means for creating a cryptographic hash value for program data within each selected section from the plurality of selected sections within the program; and storage means for storing the cryptographic hash value and a location value for each selected section as a data record within a validation structure, wherein the location is a location of the selected section within the program, wherein the means are activated when the storage device is connected to and accessed by a data processing system.

32. The storage device of claim 31, wherein the storage device is a hard disk drive.

33. The storage device of claim 31, wherein the storage device is a ROM for use with a data processing system.

34. The storage device of claim 31, wherein the storage device is a floppy diskette.

35. A storage device readable by a data processing system and encoding data processing system executable instructions for validating a program, wherein the program includes a validation structure having a plurality of data records, wherein each data record within the plurality of data records includes a cryptographic hash value for program data within a section other than a lead-in section of the program and a location value, wherein the location value indicates a location of the section, the storage device comprising:

creation means for creating a cryptographic hash value on program data within the section in the location indicated by the location value for the randomly selected data record for each randomly selected data record; and comparison means for comparing the created cryptographic hash value with the hash value within the randomly selected data record, wherein the means are activated when the storage device is connected to and accessed by a data processing system.

36. The storage device of claim 35, wherein the storage device is a hard disk drive.

37. The storage device of claim 35, wherein the storage device is a ROM for use with a data processing system.

38. The storage device of claim 35, wherein the storage device is a floppy diskette.

* * * * *